United States Patent [19]

Nakajima

[11] Patent Number: 5,583,346
[45] Date of Patent: Dec. 10, 1996

[54] METHOD FOR DETECTING PROSPECTIVE ABNORMAL PATTERNS

[75] Inventor: Nobuyoshi Nakajima, Kanagawa-ken, Japan

[73] Assignee: Fuji Photo Film Co., Ltd., Kanagawa, Japan

[21] Appl. No.: 590,534

[22] Filed: Jan. 24, 1996

[30] Foreign Application Priority Data

Jan. 24, 1995 [JP] Japan .................................. 7-042265
Jul. 12, 1995 [JP] Japan .................................. 7-175997

[51] Int. Cl.$^6$ .................................................. G01N 23/04
[52] U.S. Cl. .................................................. 250/587; 378/37
[58] Field of Search .................................................. 250/587, 584; 378/37

[56] References Cited

U.S. PATENT DOCUMENTS

| | | | |
|---|---|---|---|
| 4,527,060 | 7/1985 | Suzuki et al. | 250/327.2 |
| 5,046,147 | 9/1991 | Funahashi et al. | 250/327.2 |
| 5,365,429 | 11/1994 | Carman | 364/413.13 |
| 5,515,450 | 5/1996 | Takeo et al. | 382/132 |

OTHER PUBLICATIONS

"Detection of Tumor Patterns in DR Images (Iris Filter)" *Collected Papers of the Institute of Electronics and Communication Engineers of Japan*, D–II, vol. J75–D–II, No. 3, pp. 663–670, Mar., 1992.

"Extraction of Small Calcified Patterns with a Morphology Filter Using a Multiply Structure Element" *Collected Papers of the Institute of Electronics and Communication Engineers of Japan*, D–II, vol. J75–D–II, No. 7, pp. 1170–1176, Jul., 1992.

"Fundamentals of Morphology and Its Application to Mammogram Processing," *Medical Imaging Technology*, vol. 12, No. 1, pp. 59–66, Jan., 1994.

*Primary Examiner*—David P. Porta
*Assistant Examiner*—David Vernon Bruce
*Attorney, Agent, or Firm*—Sughrue, Mion, Zinn, Macpeak & Seas

[57] ABSTRACT

In a method for detecting a prospective abnormal pattern, a stimulable phosphor sheet, on which a radiation image of an object has been stored, is exposed to stimulating rays, which cause the stimulable phosphor sheet to emit light in proportion to the amount of energy stored thereon during its exposure to radiation. The emitted light is detected by a photoelectric read-out device, and an image signal representing the radiation image is thereby obtained. A prospective abnormal pattern is detected from the radiation image in accordance with the obtained image signal. During the detection of the prospective abnormal pattern, in accordance with the image signal, calculations are made to find a normalized read-out sensitivity and a normalized latitude, which are equivalent to read-out conditions appropriate for obtaining a visible image reproduced from the radiation image. A predetermined threshold value, which is used in detecting the prospective abnormal pattern, is set to be a large value as the normalized read-out sensitivity becomes large and/or as the normalized latitude becomes small.

18 Claims, 9 Drawing Sheets

METHOD FOR DETECTING PROSPECTIVE ABNORMAL PATTERNS

BACKGROUND OF THE INVENTION

1. Field of the Invention

This invention relates to a method for detecting a prospective abnormal pattern from an image.

2. Description of the Prior Art

Techniques for reading out a radiation image of an object and reproducing a visible radiation image have heretofore been carried out in various fields. With the techniques, a radiation image of an object, which has been recorded on a recording medium, such as a stimulable phosphor sheet or X-ray film, is read out, an image signal is thereby obtained, and the obtained image signal is subjected to appropriate image processing and then used for reproducing a visible image on a display device, or the like. In particular, recently, various digital radiography techniques, which utilize computers and are referred to as computed radiography (CR), have been proposed and applied to clinical diagnoses, or the like.

In cases where a stimulable phosphor sheet is employed as the recording medium, the radiation image of an object is stored as a level of energy during the exposure of the stimulable phosphor sheet to radiation. In such cases, the image signal representing the radiation image is obtained by exposing the stimulable phosphor sheet to stimulating rays, which cause it to emit light in proportion to the amount of energy stored thereon during its exposure to radiation, and detecting the emitted light with a photoelectric read-out means.

In the CR, a read-out sensitivity and contrast adjusting function, which is referred to as the exposure data recognizer (EDR), is employed. With the EDR, a preliminary read-out operation (hereinbelow referred to as the "preliminary read-out") is carried out in order to approximately ascertain the image information of a radiation image, which has been stored on a stimulable phosphor sheet. An electric image signal, which is to be used in reproducing a visible image capable of being used for diagnostic purposes, or the like, is obtained from a final read-out operation (hereinbelow referred to as the "final readout"). During the preliminary readout, stimulating rays are used, which have an energy level lower than the energy level of the stimulating rays used in the final readout. In accordance with the image information having been obtained from the preliminary readout, read-out conditions for the final readout, such as a read-out sensitivity (hereinbelow often referred to as the S value) and a latitude (hereinbelow often referred to as the L value), are adjusted such that the visible image reproduced from the image signal, which is obtained from the final readout, can have good image quality, e.g. an appropriate density and an appropriate contrast, and can serve as an effective tool in, particularly, the efficient and accurate diagnosis of an illness.

A method for utilizing the preliminary readout and the final readout has been disclosed in, for example, U.S. Pat. No. 4,527,060. With the disclosed method, the final readout is carried out under the read-out conditions, which have been adjusted with the EDR. The image signal obtained from the final readout is fed into an image processing means. In the image processing means, the image signal is processed in accordance with the portion of the object the image of which is recorded, the conditions under which the image is recorded, or the like, such that a visible image suitable for the diagnostic purposes, or the like, can be reproduced. A visible image is then reproduced from the processed image signal on a photographic material, or the like.

Also, a processing method, wherein the preliminary readout need not be carried out, time loss due to the preliminary readout is thereby eliminated, and the processing and the apparatus are thereby kept simple, has been proposed in, for example, U.S. Pat. No. 5,046,147. With the proposed processing method, the detection range for the light emitted by a stimulable phosphor sheet is set to be sufficiently wide (for example, approximately 4 orders of ten), and the entire radiation image is thereby read out to obtain an image signal. From the obtained image signal, an appropriate read-out sensitivity and an appropriate latitude are determined. Thereafter, in accordance with the determined read-out sensitivity and the determined latitude, the obtained image signal is transformed into an image signal, which is equivalent to the image signal, which would be obtained if the image were again read out under the conditions of the determined read-out sensitivity and the determined latitude.

With the proposed processing method, the setting values of the photoelectric read-out means with respect to the amount of the stimulating rays irradiated to the stimulable phosphor sheet, the sensitivity, the dynamic range, and the like, need not be set again, and an image signal necessary to reproduce an appropriate image can be obtained.

Further, particularly for medical diagnoses of human bodies, techniques referred to as the computer aided diagnosis of medical images (CADM) have been proposed, which aim at more positively utilizing the features of the digital radiography.

The techniques for the computer aided diagnosis of medical images, or the like, assist in making diagnoses by reading patterns in an image at the sites of medical treatment. Specifically, in the past, medical specialists visually read patterns in radiation images having been reproduced on recording media, such as X-ray film, display devices, such as cathode ray tube (CRT) display devices, or the like, and made efforts in order to find out abnormal tumor patterns, which represented cancers, or the like, small calcified patterns, which are smaller than the tumor patterns and have a density lower than the density of them, and the like, in the early stages of the diseases. (The tumor patterns, the small calcified patterns, and the like, will hereinbelow be referred to as the abnormal patterns.) However, in such cases, there is the risk that the abnormal patterns are left unnoticed or are misunderstood due to subjective judgments, depending on differences between the image understanding capabilities of persons, who view the radiation images.

Therefore, the techniques for the computer aided diagnosis of medical images aim at preventing the persons, who view the radiation images, from failing to notice the abnormal patterns and misunderstanding the abnormal patterns, and thereby aim at enabling the persons to make the efficient and accurate diagnosis of an illness. For such purposes, with the techniques for computer aided diagnosis of medical images, a prospective abnormal pattern, which is considered as being an abnormal pattern, is detected. Also, a marking is put on the detected portion in order to arouse an attention of the person, who views the radiation image. Alternatively, characteristics of the detected prospective abnormal pattern are indicated quantitatively as materials, which are useful for objective judgments of the person, who views the radiation image. [Reference should be made to "Detection of Tumor Patterns in DR Images (Iris Filter)," Collected Papers of The Institute of Electronics and Communication Engineers of Japan, D-II, Vol. J75-D-II, No. 3, pp. 663–670, March 1992;

and "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992.]

With the iris filter processing, the gradients of image signal values, which are represented by the density values of a radiation image, are calculated as gradient vectors, and information representing the degree of centralization of the gradient vectors is utilized in order to detect a prospective tumor pattern. Specifically, it has been known that, for example, in a radiation image recorded on a negative X-ray film, the density values of a tumor pattern are slightly smaller than the density values of the surrounding image areas. The gradient vector at an arbitrary picture element located in the tumor pattern is directed toward the vicinity of the center point of the tumor pattern. On the other hand, in an elongated pattern, such as a blood vessel pattern, gradient vectors do not centralize upon a specific point. Therefore, the distributions of the directions of the gradient vectors in local areas may be evaluated, and a region, in which the gradient vectors centralize upon a specific point, may be detected. The thus detected region may be taken as a prospective tumor pattern, which is considered as being a tumor pattern. The processing with the iris filter is based on such fundamental concept. Steps of algorithms of the iris filter will be described hereinbelow.

(Step 1) Calculation of Gradient Vectors

For each picture element j among all of the picture elements constituting a given image, the direction θ of the gradient vector of the image signal representing the image is calculated with Formula (1).

$$\theta = \tan^{-1} \frac{(f_3+f_4+f_5+f_6+f_7)-(f_{11}+f_{12}+f_{13}+f_{14}+f_{15})}{(f_1+f_2+f_3+f_{15}+f_{16})-(f_7+f_8+f_9+f_{10}+f_{11})} \quad (1)$$

As illustrated in FIG. 3, $f_1$ through $f_{16}$ in Formula (1) represent the picture element values (i.e., the image signal values) corresponding to the picture elements located at the peripheral areas of a mask, which has a size of five picture elements (located along the column direction of the picture element array)×five picture elements (located along the row direction of the picture element array) and which has its center at the picture element j.

(Step 2) Calculation of the Degree of Centralization of Gradient Vectors

Thereafter, for each picture element among all of the picture elements constituting the given image, the picture element is taken as a picture element of interest, and the degree of centralization C of the gradient vectors with respect to the picture element of interest is calculated with Formula (2).

$$C = (1/N) \sum_{j=1}^{N} \cos\theta_j \quad (2)$$

As illustrated in FIG. 4, in Formula (2), N represents the number of the picture elements located in the region inside of a circle, which has its center at the picture element of interest and has a radius R, and θj represents the angle made between the straight line, which connects the picture element of interest and each picture element j located in the circle, and the gradient vector at the picture element j, which gradient vector has been calculated with Formula (1). Therefore, in cases where the directions of the gradient vectors of the respective picture elements j centralize upon the picture element of interest, the degree of centralization C represented by Formula (2) takes a large value.

The gradient vector of each picture element j, which is located in the vicinity of a tumor pattern, is directed approximately to the center portion of the tumor pattern regardless of the level of the contrast of the tumor pattern. Therefore, it can be regarded that the picture element of interest associated with the degree of centralization C, which takes a large value, is the picture element located at the center portion of the tumor pattern. On the other hand, in a linear pattern, such as a blood vessel pattern, the directions of the gradient vectors are biased to a certain direction, and therefore the value of the degree of centralization C is small. Accordingly, a tumor pattern can be detected by taking each of all picture elements, which constitute the image, as the picture element of interest, calculating the value of the degree of centralization C with respect to the picture element of interest, and rating whether the value of the degree of centralization C is or is not larger than a predetermined threshold value. Specifically, the iris filter has the features over an ordinary difference filter in that the iris filter is not apt to be adversely affected by blood vessel patterns, mammary gland patterns, or the like, and can efficiently detect tumor patterns.

In actual processing, such that the detection performance unaffected by the sizes and shapes of tumor patterns may be achieved, it is contrived to adaptively change the size and the shape of the filter. FIG. 5 shows an example of the filter. The filter is different from the filter shown in FIG. 4. With the filter of FIG. 5, the degree of centralization is rated only with the picture elements, which are located along radial lines extending radially from a picture element of interest in 32 directions at 11.25 degree intervals. Also, for each of the radial lines, the output value obtained for the picture elements ranging from the center point (i.e., the picture element of interest) to a picture element, which is located along the radial line and at which the maximum degree of centralization is obtained, is taken as the degree of centralization with respect to the direction of the radial line. The mean value of the degrees of centralization, which have been obtained for all of the radial lines (in this case, 32 radial lines), is then calculated. The mean value of the degrees of centralization having thus been calculated is taken as the degree of centralization C of the gradient vector group with respect to the picture element of interest. Specifically, the degree of centralization Ci(n), which is obtained for the picture elements ranging from the picture element of interest to the n'th picture element located along the i'th radial line, is calculated with Formula (3).

$$Ci(n) = \frac{1}{n - R\min + 1} \sum_{l=R\min}^{n} \cos\theta_{il}, R\min \leq n \leq R\max \quad (3)$$

wherein Rmin and Rmax respectively represent the minimum value and the maximum value having been set for the radius of the tumor pattern, which is to be detected.

Thereafter, The degree of centralization C of the gradient vector group is calculated with Formulas (4) and (5).

$$Ci_{max} = \max_{R\min \leq n \leq R\max} Ci(n) \quad (4)$$

-continued $$C = (1/32) \sum_{i=1}^{32} C_{i_{max}} \quad (5)$$

Formula (4) represents the maximum value of the degree of centralization Ci(n) obtained for each of the radial lines with Formula (3). Therefore, the region from the picture element of interest to the picture element associated with the degree of centralization Ci(n), which takes the maximum value, may be considered as being the region of the prospective tumor pattern. By the detection of such regions for all of the radial lines with Formula (4), it is possible to judge the shape of the peripheral edge of the region, which may be regarded as the prospective tumor pattern. With Formula (4), the maximum values of the degrees of centralization within the aforesaid regions are calculated for all directions of the radial lines. Thereafter, with Formula (5), the mean value of the maximum values of the degrees of centralization within the aforesaid regions, which maximum values have been given by Formula (4) for all directions of the radial lines, is calculated. The calculated mean value is compared with a predetermined threshold value. From the results of the comparison, a judgment is made as to whether there is or is not a probability that the region having its center at the picture element of interest will be the prospective abnormal pattern.

The region, in which the degree of centralization C of the gradient vector group with Formula (5) is rated, is similar to the iris of the human's eye, which expands or contracts in accordance with the brightness of the external field. The size and the shape of the region is changed adaptively in accordance with the distribution of the gradient vectors. Therefore, the filter used is referred to as the iris filter.

(Step 3) Rating of the Shape and Form of the Prospective Tumor Pattern

In general, patterns of malignant tumors have the characteristics of the shapes and forms described in (1), (2), and (3) below.

1) The side edges are irregular.

2) The shape is close to an ellipse.

3) The region inside of the pattern has a convex or concave density distribution.

Therefore, a judgment is made as to the shape and form by considering these characteristics such that patterns of normal tissues may be eliminated from the detected prospective pattern, and such that only the prospective abnormal pattern, which is considered as being a tumor pattern, can be detected. Specifically, the characteristic measures of the prospective pattern are compared with predetermined threshold values T, and a final judgment is made as to whether the detected pattern is or is not the prospective tumor pattern. The characteristic measures used in making the judgment include the spreadness, the elongation, the roughness of side edges, the circularity, and the degree of convexity or concavity (i.e., the entropy) of the density distribution in the region inside of the pattern.

By carrying out the steps described above, the iris filter can efficiently detect a tumor pattern from a radiation image.

How the morphology processing is carried out will be described hereinbelow. The morphology processing is the technique for detecting a small calcified pattern, which is one of the characteristic forms of mammary cancers as in the cases of the tumor patterns. The morphology processing is carried out by using a multi-scale λ and a structure element (i.e., a mask) B. The morphology processing has the features in that, for example, (1) it is efficient for extracting a calcified pattern itself, (2) it is not affected by complicated background information, and (3) the extracted calcified pattern does not become distorted. Specifically, the morphology processing is advantageous over ordinary differentiation processing in that it can more accurately detect the geometrical information concerning the size, the shape, and the density distribution of the calcified pattern. The morphology processing is carried out in the manner described below.

(Fundamental Operation of Morphology Processing)

In general, the morphology operation is expanded as the theory of sets in an N-dimensional space. As an aid in facilitating the intuitive understanding, the morphology operation will be described hereinbelow with reference to a two-dimensional gray level image.

The gray level image is considered as a space, in which a point having coordinates (x, y) has a height corresponding to a density value f(x, y). In this case, it is assumed that the image signal representing the density value f(x, y) is a high luminance-high signal level type of image signal, in which a low density (i.e., a high luminance when the image is displayed on a CRT display device) is represented by a high image signal level.

Firstly, as an aid in facilitating the explanation, a one-dimensional function f(x) corresponding to the cross-section of the space is considered. It is assumed that structure element g used in the morphology operation is a symmetric function of Formula (6), which is symmetric with respect to the origin.

$$g^s(X) = g(-X) \quad (6)$$

It is also assumed that the value is 0 in a domain of definition G, which is represented by Formula (7).

$$G = \{-m, -m+1, \ldots, -1, 0, 1, \ldots, m\} \quad (7)$$

In such cases, the fundamental forms of the morphology operation are very simple operations carried out with Formulas (8), (9), (10), and (11).

$$\text{dilation}: [f \oplus G^s](i) = \max\{f(i-m), \ldots, f(i), \ldots, f(i+m)\} \quad (8)$$

$$\text{erosion}: [f \ominus G^s](i) = \min\{f(i-m), \ldots, f(i), \ldots, f(i+m)\} \quad (9)$$

$$\text{opening}: f_g = (f \ominus g^s) \oplus g \quad (10)$$

$$\text{closing}: f^g = (f \oplus g^s) \ominus g \quad (11)$$

Specifically, as illustrated in FIG. 6A, the dilation processing is the processing for retrieving the maximum value in a width of ±m (the value determined in accordance with a structure element B) having its center at a picture element of interest. As illustrated in FIG. 6B, the erosion processing is the processing for retrieving the minimum value in the width of ±m having its center at the picture element of interest. The opening processing is equivalent to the searching of the maximum value after the searching of the minimum value. Also, the closing processing is equivalent to the searching of the minimum value after the searching of the maximum value. More specifically, as illustrated in FIG. 6C, the opening processing is equivalent to the processing for smoothing the density curve f(x) from the low luminance side, and removing a convex density fluctuating portion (i.e., the portion at which the luminance is higher than that of the surrounding portions), which fluctuates in a range spatially narrower than the mask size of 2m. Also, as illustrated in FIG. 6D, the opening processing is equivalent to the processing for smoothing the density curve f(x) from the high luminance side, and removing a concave density fluctuating portion (i.e., the portion at which the luminance is lower than that of the surrounding portions), which fluctuates in the range spatially narrower than the mask size of 2m.

In cases where the structure element g is not symmetric with respect to the origin, the dilation operation with Formula (8) is referred to as the Minkowski sum, and the erosion operation with Formula (9) is referred to as the Minkowski difference.

In cases where the image signal representing the density value f(x) is a high density-high signal level type of image signal, in which a high density is represented by a high image signal level, the relationship between the density value f(x) and the image signal value becomes reverse to the relationship between the density value f(x) and the image signal value in the high luminance-high image signal level type of image signal. Therefore, the dilation processing, which is carried out on the high density-high signal level type of image signal, coincides with the erosion processing, which is carried out on the high luminance-high signal level type of image signal as shown in FIG. 6B. The erosion processing, which is carried out on the high density-high signal level type of image signal, coincides with the dilation processing, which is carried out on the high luminance-high signal level type of image signal as shown in FIG. 6A. The opening processing, which is carried out on the high density-high signal level type of image signal, coincides with the closing processing, which is carried out on the high luminance-high signal level type of image signal as shown in FIG. 6D. Also, the closing processing, which is carried out on the high density-high signal level type of image signal, coincides with the opening processing, which is carried out on the high luminance-high signal level type of image signal as shown in FIG. 6C.

The morphology processing is herein described with respect to the high luminance-high signal level type of image signal.

(Application to Detection of Calcified Patterns)

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (12) and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = f_i - \max_{\epsilon\ (1,\ldots,M)} \{(f\ominus Bi)\oplus Bi\} \quad (12)$$

$$= f_i - \max_{\epsilon\ (1,\ldots,M)} \{f_{Bi}\}$$

In Formula (12), Bi (wherein i=1, 2, ..., M) represents, for example, four linear structure elements B (in this case, M=4) shown in FIG. 7. (The four structure elements, as a whole, will hereinbelow be referred to as the multiply structure element.) In cases where the structure element B is set to be larger than the calcified pattern to be detected, a calcified pattern, which is a convex signal change portion finer than the structure element B (i.e., which is an image portion fluctuating in a spatially narrow range), is removed in the opening processing. On the other hand, an elongated non-calcified pattern is longer than the structure element B. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (12), has been carried out. Therefore, when the smoothed image signal obtained from the opening processing (i.e. the signal representing the image, from which the calcified pattern has been removed) is subtracted from the original image signal f, an image can be obtained which contains only the small prospective calcified pattern. This is the concept behind Formula (12).

As described above, in cases where the image signal is of the high density-high signal level type, the density value of the calcified pattern is smaller than the density values of the surrounding image portions, and the calcified pattern constitutes a concave signal change portion with respect to the surrounding portions. Therefore, the closing processing is applied in lieu of the opening processing, and Formula (13) is applied in lieu of Formula (12).

$$P = f_i - \min_{\epsilon\ (1,\ldots,M)} \{(f\oplus Bi)\ominus Bi\} \quad (13)$$

$$= f_i - \min_{\epsilon\ (1,\ldots,M)} \{f_{Bi}\}$$

However, it often occurs that a non-calcified pattern having the same size as the size of the calcified pattern remains in the obtained image. In such cases, the signal, which represents the non-calcified pattern and is contained in P of Formula (12), is removed by utilizing the differentiation information based upon the morphology operation carried out with Formula (14).

$$M_{grad} = (\tfrac{1}{2})\times\{f\oplus \lambda B - f\ominus \lambda B\} \quad (14)$$

A large value of Mgrad indicates a high possibility of being a calcified pattern. Therefore, a prospective calcified pattern Cs can be detected with Formula (15).

$$\text{IF } P(i,j) \geq T1 \text{ and } M_{grad}(i,j) \geq T2 \quad (15)$$
$$\text{THEN } C_s(i,j) = P \text{ else } C_s(i,j) = 0$$

In Formula (15), T1 and T2 represents the predetermined threshold values, which can be determined experimentally.

However, a non-calcified pattern, which has a size different from the size of the calcified pattern, can be removed by only the comparison of P of Formula (12) and the predetermined threshold value T1. Therefore, in cases where there is no risk that a non-calcified pattern having the same size as the size of the calcified pattern remains, it is sufficient for the condition of the first term of Formula (15), i.e. the condition of $P(i, j) \geq T1$, to be satisfied.

Finally, the cluster Cc of the calcified pattern is detected by the combination of the opening operation and the closing operation of the multi-scale in accordance with Formula (16).

$$C_c = C_s \oplus \lambda_1 B \circ \lambda_3 B \oplus \lambda_2 B \qquad (16)$$

In Formula (16), $\lambda_1$ and $\lambda_2$ are respectively determined by the maximum distance of the calcified pattern to be combined and the maximum radius of the isolated pattern to be removed, and $\lambda_3 = \lambda_1 + \lambda_2$.

As for the high luminance-high signal level type of image signal, the morphology filter is operated in the manner described above. In cases where the image signal is of the high density-high signal level type (in which a picture element of a high density has a large digital signal value), the relationship between the opening operation and the closing operation is reversed.

The threshold values T, T1, and T2, which are used respectively in the iris filter processing and the morphology filter processing in order to make a judgment as to whether the pattern is or is not the prospective abnormal pattern, are fixed values having been set experimentally. On the other hand, as described above, the image signal, which is subjected to the processing for detecting the prospective abnormal pattern, is composed of signal values obtained with the read-out sensitivity and the latitude having been adjusted by the EDR.

Therefore, the signal values also contain quantum noise of the radiation which are contained in the radiation image. The level of the image signal representing the quantum noise component fluctuates in accordance with the adjustment of the read-out sensitivity and the latitude carried out by the EDR.

As described above, the level of the image signal representing the quantum noise component fluctuates in accordance with the EDR. In such cases, if the threshold value, which is used in making a judgment as to whether the pattern is or is not the prospective abnormal pattern, is kept constant, there is the risk that the image signal representing the quantum noise component is detected by mistake as the one representing the prospective abnormal pattern.

SUMMARY OF THE INVENTION

The primary object of the present invention is to provide a method for detecting a prospective abnormal pattern, wherein the performance for detecting an prospective abnormal pattern in accordance with an image signal, which represents a radiation image, is enhanced regardless of read-out conditions, under which the image signal is detected from the radiation image.

Another object of the present invention is to provide a method for detecting a prospective abnormal pattern, which is suitable for use in a technique for computer aided diagnosis of a medical image.

The present invention provides a first method for detecting a prospective abnormal pattern, comprising the steps of:

exposing a stimulable phosphor sheet, on which a radiation image of an object has been stored, to stimulating rays, which cause the stimulable phosphor sheet to emit light in proportion to the amount of energy stored thereon during its exposure to radiation, detecting the emitted light by a photoelectric read-out means, an image signal representing the radiation image being thereby obtained, and detecting a prospective abnormal pattern from the radiation image in accordance with the obtained image signal, wherein the improvement comprises the steps of:

i) calculating a normalized read-out sensitivity and a normalized latitude in accordance with the image signal, the normalized read-out sensitivity and the normalized latitude being equivalent to read-out conditions, which are appropriate for obtaining a visible image reproduced from the radiation image, and ii) setting a predetermined threshold value, which is used in detecting the prospective abnormal pattern, to be a large value as the normalized read-out sensitivity becomes large and/or as the normalized latitude becomes small.

The term "threshold value used in detecting a prospective abnormal pattern" as used herein means the threshold value, which is used in making a judgment as to whether a pattern is or is not the prospective abnormal pattern. This also applies to the second method for detecting a prospective abnormal pattern in accordance with the present invention, which will be described later.

The detection of the prospective abnormal pattern may be carried out with (1) a detection process using an iris filter, comprising the steps of:

a) for each picture element among all of the picture elements of the image, from which the prospective abnormal pattern is to be detected, calculating a gradient vector of the image signal (for example, the density value), b) setting each picture element, which is among all of the picture elements of the image, as a picture element of interest, c) calculating the degree of centralization of the gradient vector, which has been calculated for each of the picture elements surrounding the picture element of interest, upon the picture element of interest, d) finding a region, which has its center at the picture element of interest and is constituted of only the picture elements associated with the degree of centralization, that takes a value not smaller than a predetermined value, e) making a judgment as to whether the region has or has not the possibility of being the prospective abnormal pattern, the judgment being made in accordance with the level of the degree of centralization of the gradient vectors upon the picture element of interest, which level has been calculated for the region, and f) comparing a characteristic measure concerning the shape of the region, which has been judged as having the possibility of being the prospective abnormal pattern, and the predetermined threshold value with each other.

Alternatively, the detection of the prospective abnormal pattern may be carried out with (2) a detection process using a morphology filter, comprising the steps of:

a) carrying out a morphology operation, in which an opening processing is carried out on a high luminance-high signal level type of original image signal by using a multi-scale and a multiply structure element, and an image signal having been obtained from the opening processing is subtracted from the original image signal, and b) comparing the value, which has been obtained from the morphology operation, and the predetermined threshold value with each other.

As another alternative, the detection of the prospective abnormal pattern may be carried out with (3) a detection process using a morphology filter, comprising the steps of:

a) carrying out a morphology operation, in which an opening processing is carried out on a high—luminance-high signal level type of original image signal by using a multi-scale and a multiply structure element, and an image signal having been obtained from the opening processing is subtracted from the original image signal, a first value being obtained from the morphology operation, b) calculating a second value in accordance with differential information, which is obtained by subtracting a Minkowski difference of the image signal from a Minkowski sum of the image signal, c) comparing the first value and the corresponding predetermined threshold value with each other, d) comparing the second value and the corresponding predetermined threshold value with each other, and e) detecting the prospective abnormal pattern in accordance with the results of the two comparisons.

The detection process using the morphology filter, which is described in (2) above and in which the opening processing is carried out on the high luminance-high signal level type of the image signal, also includes a detection process using a morphology filter, in which closing processing is carried out on a high density-high signal level type of image signal. This is because the opening processing, which is carried out on the high luminance-high signal level type of the image signal, and the closing processing, which is carried out on the high density-high signal level type of the image signal, are substantially identical with each other, except that the image signal is taken as the density or is taken as the luminance.

Also, the term "characteristic measure concerning a shape" as used herein means the measure obtained by quantitatively determining the spreadness of the shape, the elongation of the shape, the roughness of side edges of the shape, the circularity of the shape, the degree of convexity or concavity (i.e., the entropy) of the density distribution in the region inside of the pattern, or the like.

The threshold value described above should preferably be set such that it may be in inverse proportion to the normalized latitude. Alternatively, the threshold value described above should preferably be set such that it may be in proportion to the square root of the normalized read-out sensitivity. As another alternative, the threshold value described above should preferably be set such that it may be in inverse proportion to the normalized latitude and in proportion to the square root of the normalized read-out sensitivity.

The read-out sensitivity (S value) and the latitude (L value) will hereinbelow be described in detail.

In the CR, the "read-out sensitivity and contrast adjusting function utilizing the preliminary readout," which is referred to as the EDR, is employed. FIG. 8 is a flow chart showing the EDR processing. As illustrated in FIG. 8, an EDR image signal is obtained from the preliminary readout, which is carried out before the final readout and in which a stimulable phosphor sheet (hereinbelow often referred to as the imaging plate, i.e. IP) is coarsely scanned with a weak laser beam. Also, image recording menu information is inputted when an ID information for identifying the patient is registered. From the image signal and the image recording menu information, a subdivision pattern, in which the recording area on the stimulable phosphor sheet is divided into a plurality of subdivisions, is determined. Also, the shape and location of an irradiation field in each of the subdivisions are determined. Thereafter, a probability density function of the image signal (the image density), which corresponds to the region inside of the determined irradiation field, is formed. FIGS. 9A and 9B are graphs showing examples of probability density functions of image signals corresponding to regions inside of irradiation fields. As illustrated in FIGS. 9A and 9B, the probability density functions of the image signals have patterns inherent to the image recording menus. The image recording menu is determined by the portion of the object, the image of which is recorded, and the image recording method, such as simple image recording or contrasted image recording. By the utilization of such characteristics of the probability density function, the maximum value $S_1$ and the minimum value $S_2$ of the effective image signal can be detected. In this manner, the read-out conditions for the final readout can be adjusted such that the image density and the contrast may become appropriate.

The read-out conditions are specified by the two parameters, i.e., the read-out sensitivity (S value) and the latitude (L value) described above. Specifically, the read-out conditions determine the sensitivity of a photomultiplier and the gain of a multiplier. The final read-out image signal, which is obtained by carrying out the final readout under the adjusted read-out conditions, has been normalized to predetermined digital values regardless of the kind of the object and the kind of the image recording method used. Therefore, the image processing, which is carried out on the final read-out image signal, and the storage of the final read-out image signal can be carried out easily. Further, from the final read-out image signal, a visible image having an appropriate density or luminance and an appropriate contrast can be reproduced on photographic film, a CRT monitor, or the like.

FIG. 10 is a graph showing a principle, upon which the EDR processing is based.

With reference to FIG. 10, a first quadrant shows the relationship between the dose of X-rays irradiated to an IP and the intensity of light emitted by the IP. The intensity of the light emitted by the IP is in proportion to the dose of X-rays irradiated to the IP over a wide range of the dose. The relationship is one of the features of the IP which are worthy of special mention.

The second quadrant shows the EDR function, i.e., shows the relationship between the intensity of the emitted light, which is entered into a read-out means, and an output digital signal, which is obtained under the read-out conditions having been adjusted by the EDR.

The third quadrant shows how the image emphasis processing (i.e., frequency processing and gradation processing) is carried out for obtaining display characteristics appropriate for diagnostic purposes, or the like. In FIG. 10, an example of a gradation processing curve appropriate for a mamma image is shown.

The fourth quadrant shows a characteristic curve of an output photograph in the CR system. Specifically, the dose of X-rays irradiated to the IP is plotted on the horizontal axis, and the density on photographic film is plotted on the vertical axis extending downwardly. The characteristic curve takes on the form of an inverted characteristic curve of an X-ray photograph obtained with an ordinary fluorescent intensifying screen-film system. As described above, with the EDR, the maximum value $S_1$ and the minimum value $S_2$ of the image signal effective for diagnostic purposes, or the like, are detected from the probability density function of the EDR image signal. Also, the read-out conditions are adjusted such that the maximum value $S_1$ and the minimum value $S_2$ may be converted respectively into values $Q_1$ and $Q_2$, which have been set previously for each image recording menu.

Specifically, as for an example (i), in which the dose of X-rays irradiated to the IP is high and the image signal range is narrow, the EDR adjusts the read-out conditions as indicated by (A). As for an example (ii), in which the dose of X-rays irradiated to the IP is low and the image signal range is wide, the EDR adjusts the read-out conditions as indicated by (B). As a result, the characteristic curve of the CR system varies for different doses of X-rays and different widths of image signal ranges, and an appropriate image density and an appropriate contrast can be obtained in every case. This feature is markedly different from the characteristic curve of the conventional fluorescent intensifying screen-film system.

As described above, in the CR, the read-out conditions are defined by the two parameters, i.e., the read-out sensitivity and the latitude. FIG. 11 is a graph showing the relationship between the amount of light emitted by an IP and an output value, the graph serving as an aid in explaining a read-out sensitivity (S value) and a latitude (L value), which serve as read-out conditions. The S value is the index representing the read-out sensitivity, and the L value is the index representing the latitude. The read-out conditions, under which the image signal is obtained, can be known from the two indexes.

The S value, which is the index representing the read-out sensitivity, is defined by Formulas (17) and (18)

$$S = 4 \times 10^{4-Sk} \quad (17)$$

$$Sk = \log(x/20(mR)) + 3.0 \quad (18)$$

wherein Sk is the value representing the amount of light emitted by the IP, which amount of light corresponds to the median value (511 in the cases of 10 bits) of the digital picture element values.

The value Sk representing the amount of light emitted by the IP is of the logarithmic scale, wherein the amount of emitted light, which is obtained from the IP having been exposed to a dose of 20 mR ($=5.16 \times 10^{-6}$C/kg) at a tube voltage of 25 kVp of an Mo tube, is taken as a reference value of 3.0. In cases where the Sk value is equal to the reference value of 3.0, the S value is equal to 40. As the dose of X-rays irradiated to the IP becomes relatively large, the Sk value becomes large and the S value becomes small. This means that, since the amount of light emitted by the IP is large, even if the read-out sensitivity is low, a sufficient signal can be taken up.

The L value is the index representing the range of the amount of light emitted by the IP, which range has its center at the Sk value and is digitized. The L value is defined by Formula (19)

$$L = (1024/1) \times \{(\log S_1 - \log S_2)/(Q_1 - Q_2)\} \quad (19)$$

wherein $S_1$ and $S_2$ represent the aforesaid characteristic values detected by the EDR, and $Q_1$ and $Q_2$ represent the picture element values corresponding respectively to the characteristic values $S_1$ and $S_2$.

For example, in cases where images having the same contrast of energy from X-rays are respectively read out with an L value of 1 and an L value of 2, the digital values obtained with the L value of 1 have a difference two times as large as the difference of the digital values obtained with the L value of 2.

With the EDR, the read-out conditions (i.e., the S value and the L value) are adjusted by primarily aiming at obtaining a reproduced visible image which has an appropriate density and an appropriate contrast and can serve as an effective tool in, particularly, the efficient and accurate diagnosis of an illness. For example, as for an image having a narrow dynamic range, the contrast of the image is positively enhanced such that a visible image having good image quality can be reproduced and used as an effective tool in, particularly, the accurately and efficient diagnosis of an illness.

The S value and the L value, which serve as the read-out conditions, are adjusted in the manner described above by the EDR.

A technique for adjusting an appropriate read-out sensitivity and an appropriate level of contrast with the EDR, wherein the aforesaid preliminary readout need not be carried out, has been proposed in, for example, U.S. Pat. No. 5,046,147. The EDR, wherein the preliminary readout need not be carried out, will be described hereinbelow.

In the aforesaid system utilizing the preliminary readout, the radiation image having been stored on the stimulable phosphor sheet is approximately ascertained by carrying out the preliminary readout. With the first method for detecting a prospective abnormal pattern in accordance with the present invention, the preliminary readout is not carried out, and the radiation image having been stored on the stimulable phosphor sheet cannot be approximately ascertained previously. Therefore, during the operation for reading out the radiation image from the stimulable phosphor sheet, the detection range for the detection of the light emitted by the stimulable phosphor sheet is set to be sufficiently wide. In this manner, the entire information of the radiation image can be detected as the image signal. In accordance with the detected image signal, in the same manner as that in the system utilizing the preliminary readout, calculations are made to find the two parameters, i.e., the read-out sensitivity (the S value) and the latitude (the L value), which serve as the read-out conditions for obtaining an appropriate reproduced visible image. Also, the image signal, which has been obtained from the image read-out operation, is converted in accordance with the calculated read-out sensitivity (S value) and the calculated latitude (L value).

During the conversion processing, a conversion table may be created in accordance with the calculated read-out sensitivity (S value) and the calculated latitude (L value). Also, the entire image signal may be converted in accordance with the conversion table.

Further, when the prospective abnormal pattern is to be detected from the image signal, which has been obtained from the conversion processing, by utilizing the aforesaid iris filter, the morphology filter, or the like, the predetermined threshold value to be used in detecting the prospective abnormal pattern may be changed in accordance with the read-out sensitivity and/or the latitude.

The present invention also provides a second method for detecting a prospective abnormal pattern, comprising the steps of:

carrying out a preliminary read-out operation by exposing a stimulable phosphor sheet, on which a radiation image of an object has been stored, to stimulating rays, which cause the stimulable phosphor sheet to emit light in proportion to the amount of energy stored thereon during its exposure to radiation and which have an energy level lower than the energy level of stimulating rays used in a final read-out operation, and detecting the emitted light by a photoelectric read-out means, an image signal representing the radiation image being thereby obtained, image information of the radiation image being approximately ascertained from the obtained image signal, adjusting a read-out sensitivity and a latitude, which serve as read-out conditions for the final read-out operation, in accordance with the information having been obtained from the preliminary read-out operation, carrying out the final read-out operation by exposing the stimulable phosphor sheet to the stimulating rays, and detecting the light, which is emitted by the stimulable phosphor sheet during its exposure to the stimulating rays, by a photoelectric read-out means, an image signal representing the radiation image being thereby obtained, the final read-out operation being carried out under the adjusted read-out conditions, and detecting a prospective abnormal pattern from the radiation image in accordance with the image signal, which has been obtained from the final read-out operation, wherein the improvement comprises the steps of setting a predetermined threshold value, which is used in detecting the prospective abnormal pattern, to be a large value as the read-out sensitivity becomes large and/or as the latitude becomes small.

In the second method for detecting a prospective abnormal pattern in accordance with the present invention, the detection of the prospective abnormal pattern may be carried out with the aforesaid detection process using the iris filter or with one of the two detection processes using the morphology filter. Also, the threshold value described above should preferably be set such that it may be in inverse proportion to the latitude. Alternatively, the threshold value described above should preferably be set such that it may be in proportion to the square root of the read-out sensitivity. As another alternative, the threshold value described above should preferably be set such that it may be in inverse proportion to the latitude and in proportion to the square root of the read-out sensitivity.

The first and second methods for detecting a prospective abnormal pattern in accordance with the present invention may be applied to the aforesaid apparatus for the computer aided diagnosis of medical images.

Specifically, in the apparatus for computer aided diagnosis of medical images, a marking may be put on the prospective tumor pattern having been detected with one of the methods for detecting a prospective abnormal pattern in accordance with the present invention. Alternatively, characteristics of the detected prospective tumor pattern may be quantitatively presented. As another alternative, the entire image may be displayed on a display device, such as a CRT display device, with a standard image size, and only the prospective tumor pattern may be displayed with an enlarged image size. In such cases, the methods for detecting a prospective abnormal pattern in accordance with the present invention become more useful for the person, who views the radiation image, to make a judgment.

With the methods for detecting a prospective abnormal pattern in accordance with the present invention, even if the L value or the S value fluctuates due to the EDR processing, the threshold value, which is to be used in making a final judgment as to whether a pattern is or is not the prospective abnormal pattern, is changed in accordance with the amount of fluctuation in the L value or the S value. Therefore, for example, in cases where the processing for detecting the prospective abnormal pattern is carried out on the image signal, which has been detected from a radiation image on which quantum noise has been superposed, and the level of the quantum noise fluctuates due to the EDR processing, the threshold value is changed such that the quantum noise may not be detected by mistake as the prospective abnormal pattern. Accordingly, the performance, with which the prospective abnormal pattern is detected, can be kept high.

DESCRIPTION OF THE PREFERRED EMBODIMENTS

The present invention will hereinbelow be described in further detail with reference to the accompanying drawings.

Figure 1A:
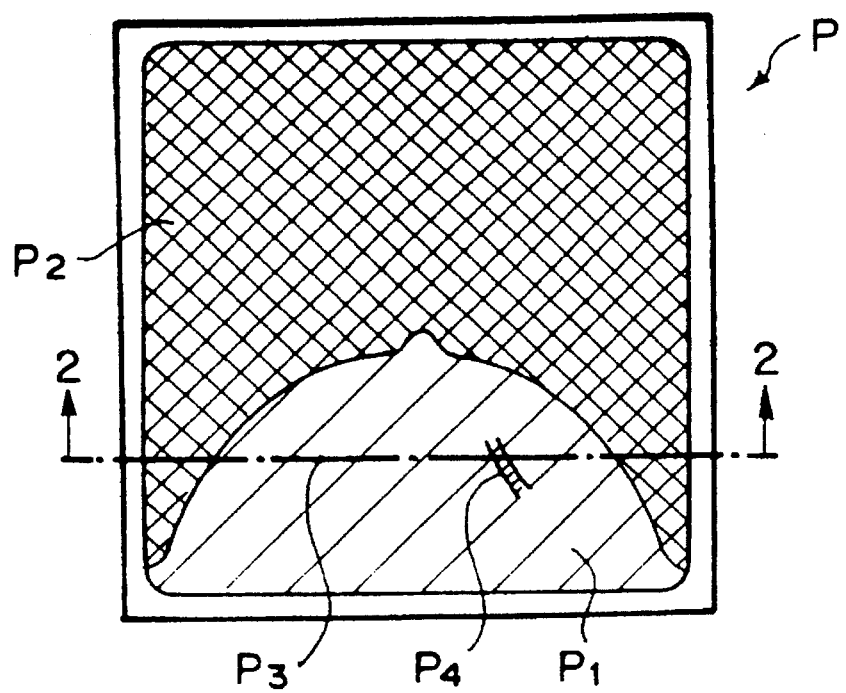
FIG. 1A is an explanatory view showing an X-ray image P containing an image $P_1$ of the mamma, which serves as an object.
Figure 1B:
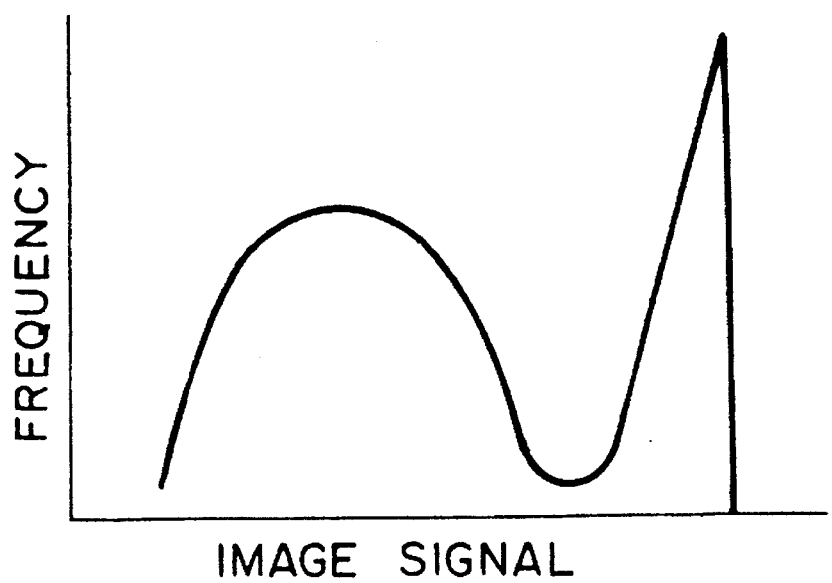
FIG. 1B is a graph showing a probability density function of a digital image signal, which has been detected by reading out the X-ray image P under the conditions of a predetermined S value and a predetermined L value obtained with EDR processing.

FIG. 1A is an explanatory view showing an X-ray image P containing an image $P_1$ of the mamma, which serves as an object. FIG. 1B is a graph showing a probability density function of a digital image signal, which has been detected by reading out the X-ray image P under the conditions of a predetermined read-out sensitivity (S value) and a predetermined latitude (L value) obtained with EDR processing.

Figures 2, 3:
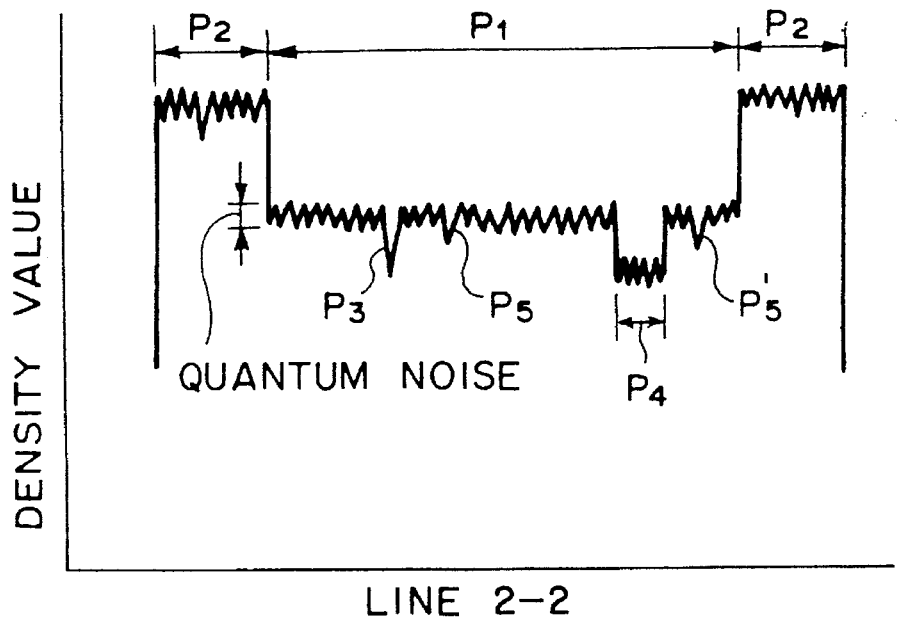
FIG. 2 is a graph showing a distribution of values of density (digital image signal) representing the X-ray image P, the distribution being taken along line I—I of FIG. 1A.
FIG. 3 is an explanatory view showing a mask for calculating gradient vectors.
Figure 4:
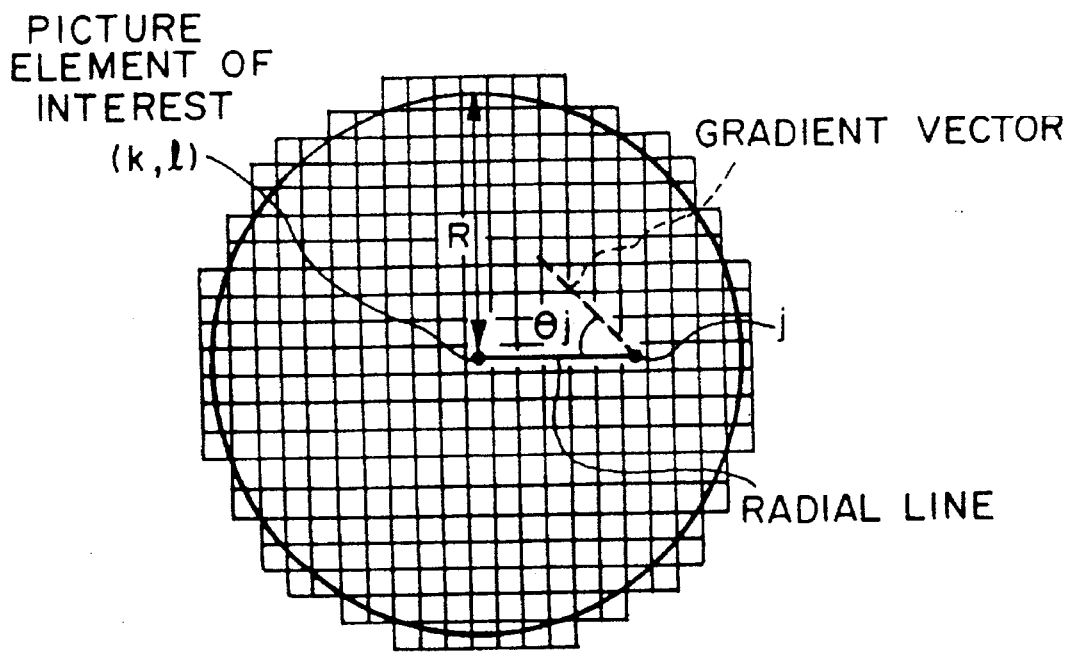
FIG. 4 is an explanatory view showing the concept behind the degree of centralization of a gradient vector with respect to a picture element of interest.
Figure 5:
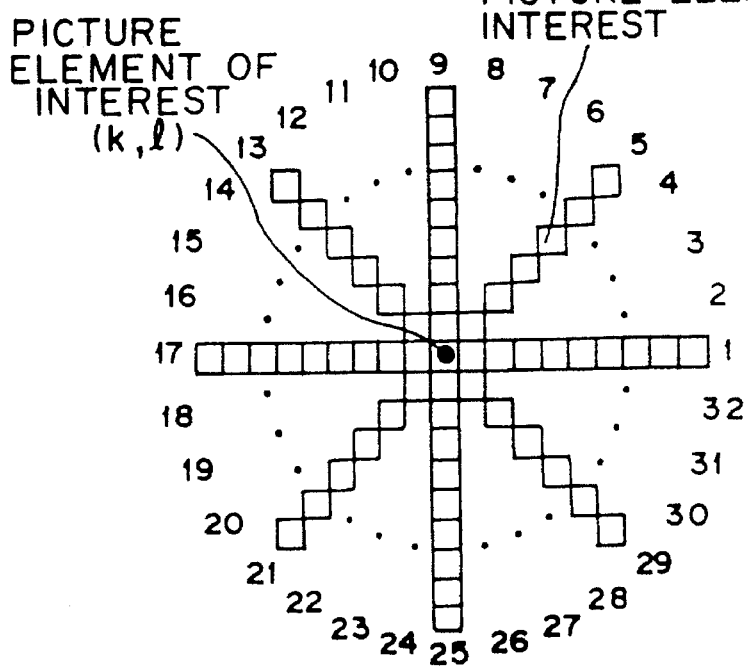
FIG. 5 is an explanatory view showing a plurality of radial lines extending radially from a picture element of interest.
Figure 6A:
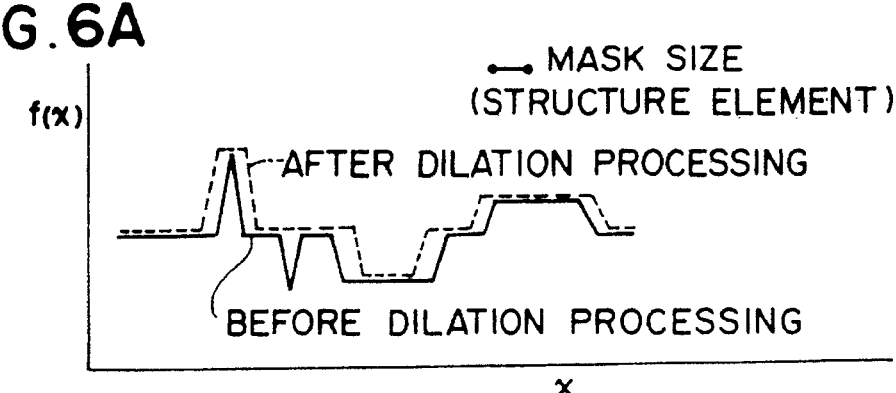
FIG. 6A is a graph showing how a dilation processing, which is one of fundamental operations with a morphology filter, is carried out.
Figure 6B:
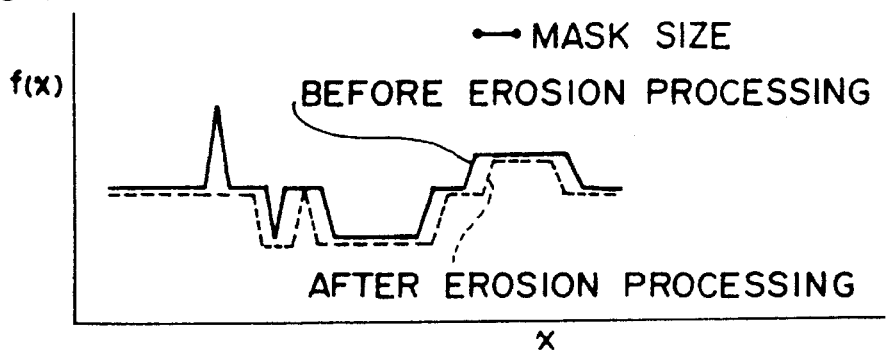
FIG. 6B is a graph showing how an erosion processing, which is one of fundamental operations with a morphology filter, is carried out.
Figure 6C:
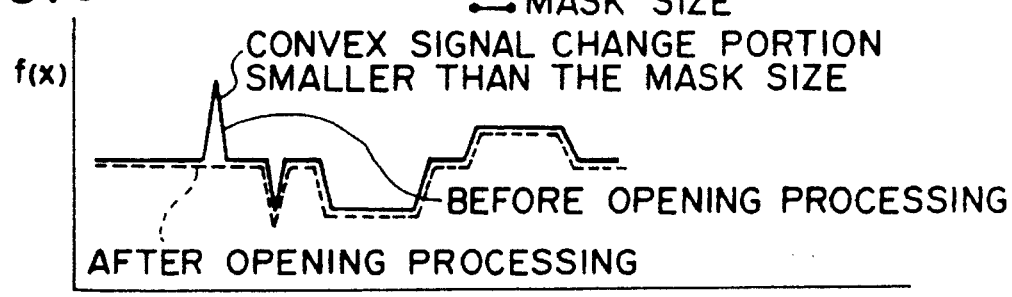
FIG. 6C is a graph showing how an opening processing, which is one of fundamental operations with a morphology filter, is carried out.
Figure 6D:
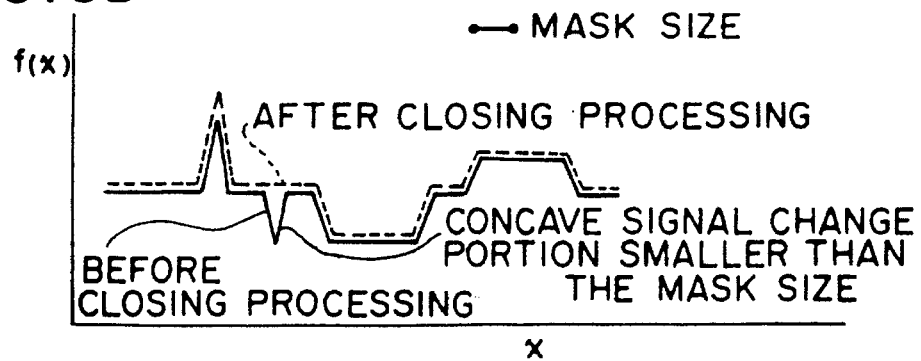
FIG. 6D is a graph showing how a closing processing, which is one of fundamental operations with a morphology filter, is carried out.
Figure 7:
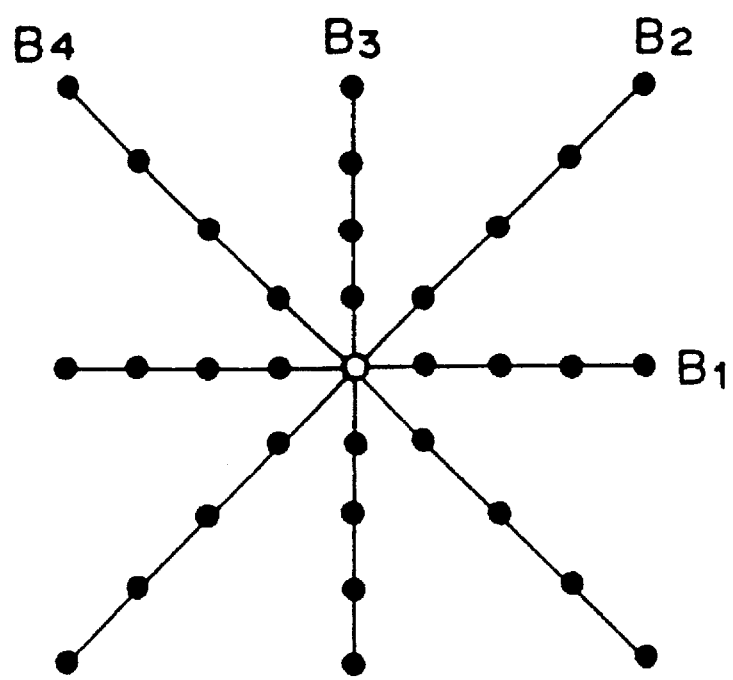
FIG. 7 is an explanatory view showing four structure elements employed in a morphology filter.
Figure 8:
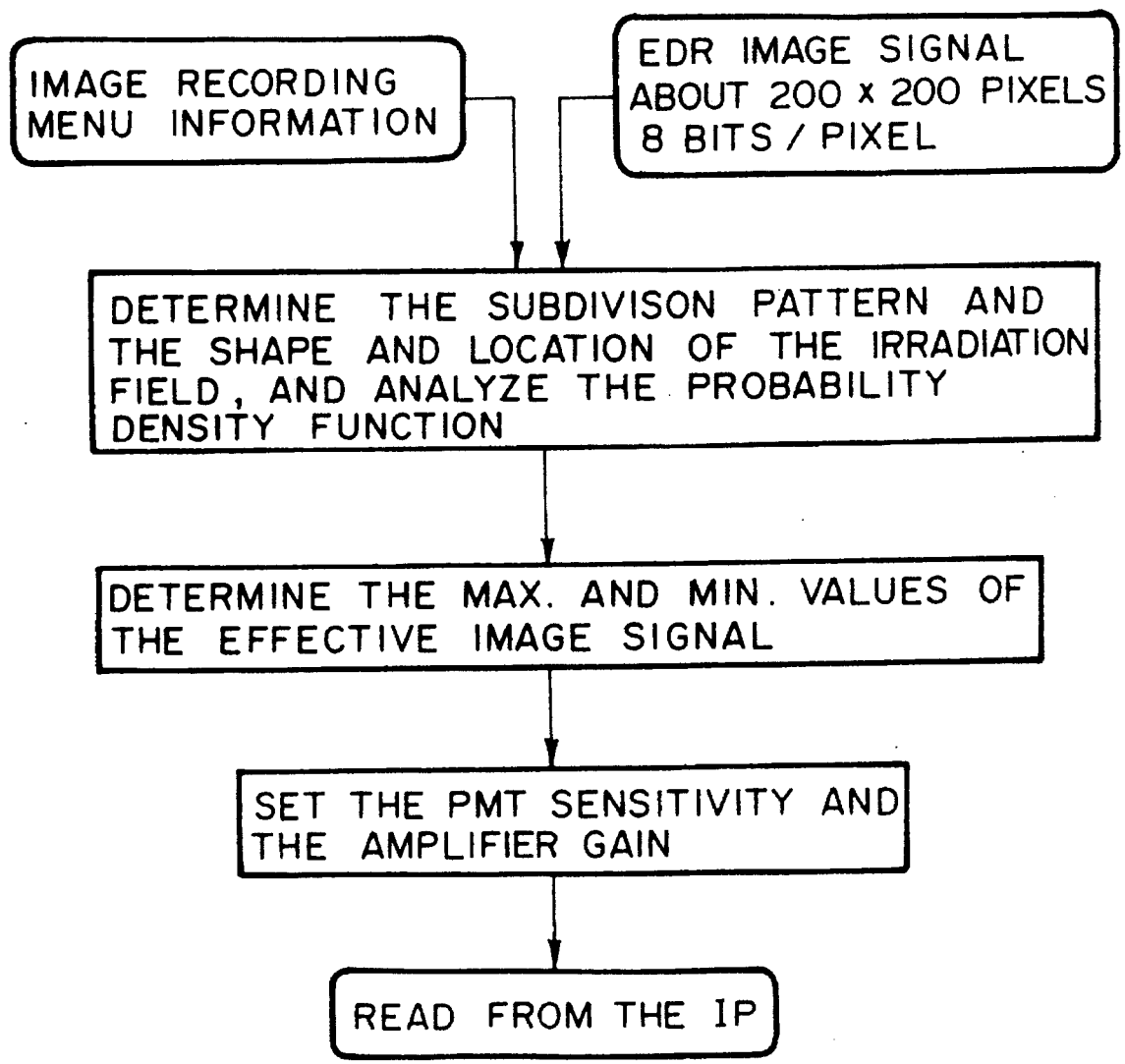
FIG. 8 is a flow chart showing EDR processing.
Figure 9A:
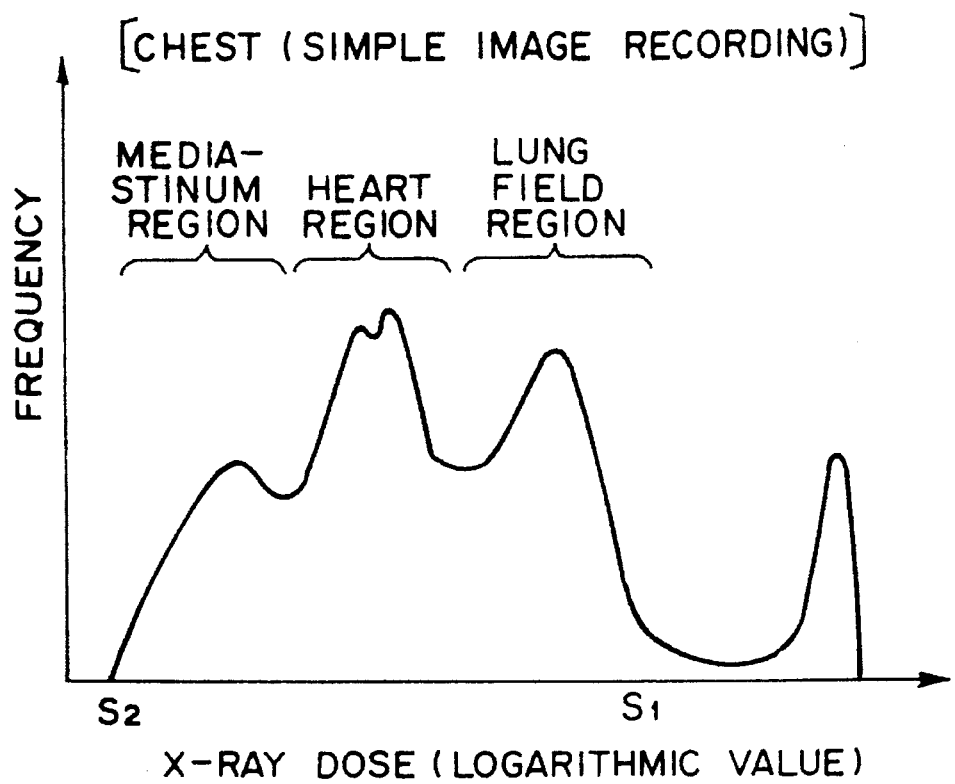
FIGS. 9A and 9B are graphs showing examples of probability density functions of image signals corresponding to regions inside of irradiation fields.
Figure 9B:
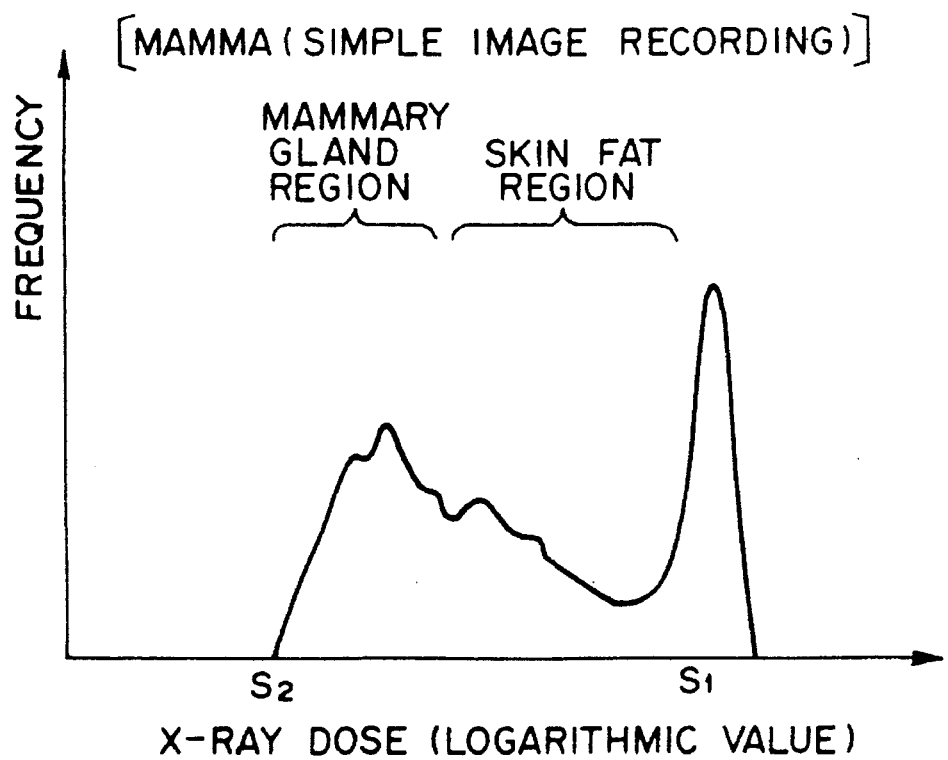
Figure 10:
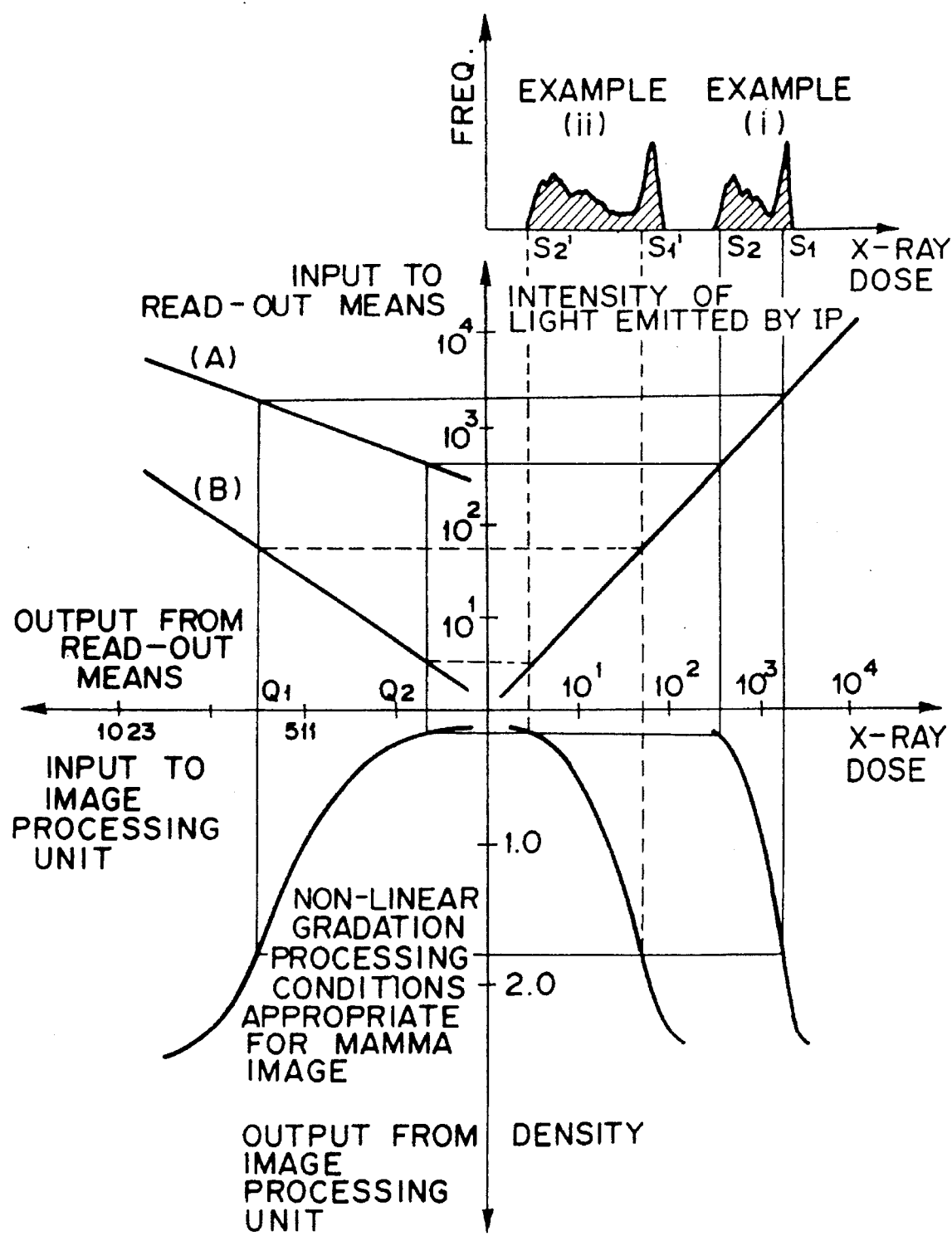
FIG. 10 is a graph showing a principle, upon which EDR processing is based.
Figure 11:
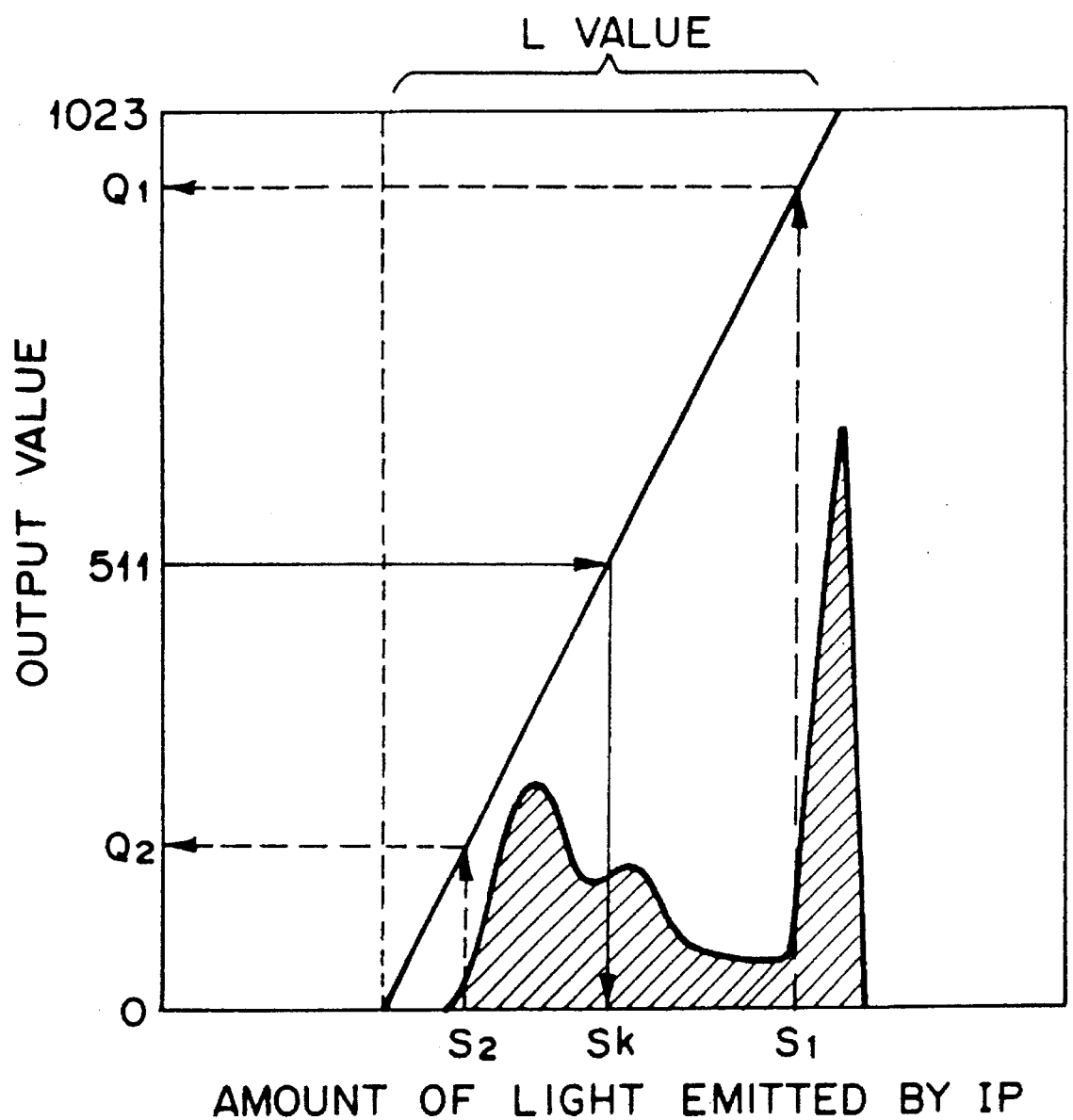
FIG. 11 is a graph showing the relationship between the amount of light emitted by an IP and an output value, the graph serving as an aid in explaining a read-out sensitivity (S value) and a latitude (L value), which serve as read-out conditions.

FIG. 2 is a graph showing a distribution of values of density (digital image signal) representing the X-ray image P, the distribution being taken along line I—I of FIG. 1A. In the X-ray image P, the region other than the mamma image $P_1$ is a background region $P_2$, upon which the X-rays impinged directly during an operation for recording the X-ray image P and which has the highest density in the X-ray image P.

In this embodiment, the image signal (the density value) is the high density-high digital value type of image signal, which has a high digital image value for a high density of the X-ray image P.

On the line I—I of FIG. 1A, a small calcified pattern $P_3$ and a blood vessel pattern $P_4$ extending in a predetermined direction are located. Further, as illustrated in FIG. 2, quantum noise $P_5$ of the X-rays is contained in the entire image.

The processing with the morphology filter is carried out with Formula (12) on the image signal. In the morphology filter processing, structure elements, which are smaller than the blood vessel pattern $P_4$ and larger than the small calcified pattern $P_3$, are used. By the morphology filter processing, the blood vessel pattern $P_4$ is removed, and only the small calcified pattern $P_3$ is detected.

However, by the morphology filter processing, a portion $P_5'$ of the noise component $P_5$, or the like, which has the same size as the size of the small calcified pattern $P_3$, is detected together with the small calcified pattern $P_3$. Therefore, the portion $P_5'$ of the noise component, or the like, is removed by utilizing the differentiation information based upon the morphology operation carried out with Formula (14).

A large value of Mgrad of Formula (14) represents a high possibility that the pattern will be the small calcified pattern $P_3$. Therefore, a prospective calcified pattern Cs can be detected by making the calculation with Formula (15).

In Formula (15), T1 and T2 are the threshold values, which are used in discriminating the small calcified pattern $P_3$ and a non-calcified pattern (such as the portion $P_5'$ of the noise component) from each other. The level of the noise component $P_5$ fluctuates in accordance with the S value and the L value, which are obtained from the EDR processing. Therefore, instead of being set to be the fixed numbers, the threshold values T1 and T2 are set respectively with Formulas (20) and (21) by using the L value, which is obtained from the EDR processing.

$$T1=C_1/L \; (C_1 \text{ is a fixed number}) \quad (20)$$

$$T2=C_2/L \; (C_2 \text{ is a fixed number}) \quad (21)$$

Specifically, as described above, in cases where the L value obtained from the EDR processing is large, the width of the obtained image signal values becomes small, and therefore the contrast of the portion $P_5'$ of the noise component is also reduced. Accordingly, even if the threshold values are set as being small values, the small calcified pattern $P_3$ and the portion $P_5'$ of the noise component, which is a non-calcified pattern, can be discriminated from each other. In this manner, only the small calcified pattern $P_3$ can be detected accurately.

In cases where the L value obtained from the EDR processing is small, the width of the obtained image signal values becomes large, and therefore the contrast of the portion $P_5'$ of the noise component is also increased. In such cases, if the threshold values are fixed as in the conventional techniques, the small calcified pattern $P_3$ and the portion $P_5'$ of the noise component, which is a non-calcified pattern, cannot be discriminated from each other. However, with this embodiment of the method for detecting a prospective abnormal pattern in accordance with the present invention, wherein the threshold values are set to be large when the L value becomes small, the small calcified pattern $P_3$ and the portion $P_5'$ of the noise component, which is a non-calcified pattern, can be discriminated from each other.

Alternatively, the threshold values T1 and T2 may be set respectively with Formulas (22) and (23) by using the S value, which is obtained from the EDR processing, such that they may be in proportion to the square root of the S value. As another alternative, the threshold values T1 and T2 may be set respectively with Formulas (24) and (25) such that they may be in inverse proportion to the L value and in proportion to the square root of the S value.

$$T1=C_3 S^{1/2} \; (C_3 \text{ is a fixed number}) \quad (22)$$

$$T2=C_4 S^{1/2} \; (C_4 \text{ is a fixed number}) \quad (23)$$

$$T1=C_5 S^{1/2}/L \; (C_5 \text{ is a fixed number}) \quad (24)$$

$$T2=C_6 S^{1/2}/L \; (C_6 \text{ is a fixed number}) \quad (25)$$

As described above, with this embodiment of the method for detecting a prospective abnormal pattern in accordance with the present invention, the performance, with which the abnormal pattern is detected, can be kept high regardless of the read-out conditions, under which the image signal is detected and which are adjusted with the EDR.

In the embodiment described above, the morphology filter is utilized in order to detect the prospective abnormal pattern. However, the method for detecting a prospective abnormal pattern in accordance with the present invention is not limited to the detection with the morphology filter and is applicable to the detection with the iris filter and to any of the other processes, which are capable of detecting the prospective abnormal pattern by using threshold values.

For example, the process for detecting the prospective abnormal pattern by utilizing the iris filter may be carried out in the manner described below. Specifically, for each picture element among all of the picture elements of the image, from which a prospective abnormal pattern is to be detected, the gradient vector of the image signal, which has been obtained with the EDR processing, is calculated with Formula (1). Thereafter, each picture element, which is among all of the picture elements of the image, is set as a picture element of interest. Also, a plurality of radial lines, which extend radially from the picture element of interest, are set. A calculation is then made to find the arithmetic mean value of the gradient vectors having been calculated for the picture elements, which are located along each of the radial lines. The degree of centralization of the gradient vectors, which have been calculated for the picture elements located along each radial line, upon the picture element of interest is thus calculated with Formula (3). The degree of centralization represents the degree, with which the gradients of the density values along the direction of the radial line are directed to the picture element of interest. Further, with Formula (4), the region from the picture element of interest to the picture element, which is associated with the maximum degree of centralization, is taken as the region of a prospective tumor pattern. The processing is carried out for all of the directions of the radial lines, and the contour of the region, which is associated with the maximum degree of centralization upon the picture element of interest, is thereby determined.

Thereafter, the mean value of the degrees of centralization having been calculated for the region, the contour of which has been determined, is calculated with Formula (5). The mean value thus calculated is then compared with a predetermined threshold value. In cases where the mean value is larger than the threshold value, it is judged that the region has the possibility of being the prospective tumor pattern. In cases where the mean value is smaller than the threshold value, it is judged that the region is not the prospective tumor pattern.

In cases where it has been judged that the region has the possibility of being the prospective tumor pattern, the characteristic measure concerning the shape of the region is calculated. For example, a calculation is made to find the characteristic measure concerning the spreadness, the elongation, the roughness of side edges, the circularity, or the degree of convexity or concavity (i.e., the entropy) of the density distribution in the region, or a combination of two or more of these measures.

In cases where the prospective tumor pattern is of a malignant tumor, the shape of the region has the specific characteristics. Therefore, the processing utilizing the characteristic measure is carried out in order to make an ultimate judgment as to whether the prospective tumor pattern is or is not the abnormal pattern.

Specifically, the characteristic measure concerning the shape of the region and a threshold value T, which is appropriate for making a judgment as to the abnormal pattern, are compared with each other. In cases where the characteristic measure is larger than the threshold value T, it is judged that the region is the abnormal pattern. In cases where the characteristic measure is smaller than the threshold value T, it is judged that the region is not the abnormal pattern.

The threshold value T is set to be a large value as the S value, which is obtained from the EDR processing, becomes large. Alternatively, the threshold value T may be set to be a large value as the L value, which is obtained from the EDR processing, becomes small. As another alternative, the threshold value T may be set to be a large value as the S value becomes large and as the L value becomes small.

Specifically, in cases where the L value obtained from the EDR processing is large, the width of the obtained image signal values becomes small. For example, in cases where quantum noise is superposed upon the image signal, the characteristic measure concerning the shape of the region, such as the roughness of side edges, which is due to the noise component, also becomes small. Therefore, if the threshold value T is not set to be a small value, the abnormal pattern cannot be detected. In cases where the L value obtained from the EDR processing is small, the width of the obtained image signal values becomes large, and the roughness of side edges of the region found from the image signal, upon which quantum noise is superposed, also becomes large. Therefore, if the threshold value T is not set to be a large value, a pattern, which is not the abnormal pattern, will be detected as the abnormal pattern.

In the same manner as that represented by Formulas (22) and (23), the threshold value T may be set such that it may be in proportion to the square root of the S value. Alternatively, in the same manner as that represented by Formulas (24) and (25), the threshold value T may be set such that it may be in inverse proportion to the L value and in proportion to the square root of the S value.

As described above, with this embodiment of the method for detecting a prospective abnormal pattern in accordance with the present invention, the performance, with which the abnormal pattern is detected, can be kept high regardless of the read-out conditions, under which the image signal is detected and which are adjusted with the EDR.

In the embodiments described above, the preliminary readout and the final readout are carried out. Specifically, the read-out sensitivity and the latitude are adjusted in accordance with the information, which is obtained from the preliminary readout, and the final readout is carried out under the conditions of the read-out sensitivity and the latitude, which have thus been adjusted. The image signal for obtaining an appropriate visible reproduced image is thereby obtained in the image read-out step. The method for detecting a prospective abnormal pattern in accordance with the present invention is not limited to the system, wherein the preliminary readout and the final readout are carried out, and is also applicable to the system, wherein the preliminary readout is not carried out and only the final readout is carried out.

The method for detecting a prospective abnormal pattern in accordance with the present invention may be applied to the aforesaid apparatus for the computer aided diagnosis of medical images.

What is claimed is:

1. A method for detecting a prospective abnormal pattern, comprising the steps of:

exposing a stimulable phosphor sheet, on which a radiation image of an object has been stored, to stimulating rays, which cause the stimulable phosphor sheet to emit light in proportion to the amount of energy stored thereon during its exposure to radiation, detecting the emitted light by a photoelectric read-out means, an image signal representing the radiation image being thereby obtained, and detecting a prospective abnormal pattern from the radiation image in accordance with the obtained image signal, wherein the improvement comprises the steps of:

i) calculating a normalized read-out sensitivity and a normalized latitude in accordance with the image signal, said normalized read-out sensitivity and said normalized latitude being equivalent to read-out conditions, which are appropriate for obtaining a visible image reproduced from the radiation image, and ii) setting a predetermined threshold value, which is used in detecting the prospective abnormal pattern, to be a large value as said normalized read-out sensitivity becomes large and/or as said normalized latitude becomes small.

2. A method as defined in claim 1 wherein the detection of said prospective abnormal pattern is carried out with a detection process using an iris filter, comprising the steps of:

a) for each picture element among all of the picture elements of the image, from which said prospective abnormal pattern is to be detected, calculating a gradient vector of the image signal, b) setting each picture element, which is among all of the picture elements of the image, as a picture element of interest, c) calculating the degree of centralization of the gradient vector, which has been calculated for each of the picture elements surrounding said picture element of interest, upon said picture element of interest, d) finding a region, which has its center at said picture element of interest and is constituted of only the picture elements associated with the degree of centralization, that takes a value not smaller than a predetermined value, e) making a judgment as to whether said region has or has not the possibility of being said prospective abnormal pattern, said judgment being made in accordance with the level of the degree of centralization of the gradient vectors upon said picture element of interest, which level has been calculated for said region, and f) comparing a characteristic measure concerning the shape of said region, which has been judged as having the possibility of being said prospective abnormal pattern, and said predetermined threshold value with each other.

3. A method as defined in claim 1 wherein the detection of said prospective abnormal pattern is carried out with a detection process using a morphology filter, comprising the steps of:

a) carrying out a morphology operation, in which an opening processing is carried out on a high luminance-high signal level type of original image signal by using a multi-scale and a multiply structure element, and an image signal having been obtained from said opening processing is subtracted from said original image signal, and b) comparing the value, which has been obtained from said morphology operation, and said predetermined threshold value with each other.

4. A method as defined in claim 1 wherein the detection of said prospective abnormal pattern is carried out with a detection process using a morphology filter, comprising the steps of:

a) carrying out a morphology operation, in which an opening processing is carried out on a high luminance-high signal level type of original image signal by using a multi-scale and a multiply structure element, and an image signal having been obtained from said opening processing is subtracted from said original image signal, a first value being obtained from said morphology operation, b) calculating a second value in accordance with differential information, which is obtained by subtracting a Minkowski difference of said image signal from a Minkowski sum of said image signal, c) comparing said first value and the corresponding predetermined threshold value with each other, d) comparing said second value and the corresponding predetermined threshold value with each other, and e) detecting said prospective abnormal pattern in accordance with the results of the two comparisons.

5. A method as defined in claim 1 wherein said threshold value is set such that it may be in inverse proportion to said normalized latitude and/or in proportion to the square root of said normalized read-out sensitivity.

6. A method as defined in claim 2 wherein said threshold value is set such that it may be in inverse proportion to said normalized latitude and/or in proportion to the square root of said normalized read-out sensitivity.

7. A method as defined in claim 3 wherein said threshold value is set such that it may be in inverse proportion to said normalized latitude and/or in proportion to the square root of said normalized read-out sensitivity.

8. A method as defined in claim 4 wherein said threshold value is set such that it may be in inverse proportion to said normalized latitude and/or in proportion to the square root of said normalized read-out sensitivity.

9. A method as defined in claim 1 wherein said radiation image is a medical image.

10. A method for detecting a prospective abnormal pattern, comprising the steps of:

carrying out a preliminary read-out operation by exposing a stimulable phosphor sheet, on which a radiation image of an object has been stored, to stimulating rays, which cause the stimulable phosphor sheet to emit light in proportion to the amount of energy stored thereon during its exposure to radiation and which have an energy level lower than the energy level of stimulating rays used in a final read-out operation, and detecting the emitted light by a photoelectric read-out means, an image signal representing the radiation image being thereby obtained, image information of the radiation image being approximately ascertained from the obtained image signal, adjusting a read-out sensitivity and a latitude, which serve as read-out conditions for the final read-out operation, in accordance with the information having been obtained from the preliminary read-out operation, carrying out the final read-out operation by exposing the stimulable phosphor sheet to the stimulating rays, and detecting the light, which is emitted by the stimulable phosphor sheet during its exposure to the stimulating rays, by a photoelectric read-out means, an image signal representing the radiation image being thereby obtained, the final read-out operation being carried out under the adjusted read-out conditions, and detecting a prospective abnormal pattern from the radiation image in accordance with the image signal, which has been obtained from the final read-out operation, wherein the improvement comprises the steps of setting a predetermined threshold value, which is used in detecting the prospective abnormal pattern, to be a large value as said read-out sensitivity becomes large and/or as said latitude becomes small.

11. A method as defined in claim 10 wherein the detection of said prospective abnormal pattern is carried out with a detection process using an iris filter, comprising the steps of:

a) for each picture element among all of the picture elements of the image, from which said prospective abnormal pattern is to be detected, calculating a gradient vector of the image signal, b) setting each picture element, which is among all of the picture elements of the image, as a picture element of interest, c) calculating the degree of centralization of the gradient vector, which has been calculated for each of the picture elements surrounding said picture element of interest, upon said picture element of interest, d) finding a region, which has its center at said picture element of interest and is constituted of only the picture elements associated with the degree of centralization, that takes a value not smaller than a predetermined value, e) making a judgment as to whether said region has or has not the possibility of being said prospective abnormal pattern, said judgment being made in accordance with the level of the degree of centralization of the gradient vectors upon said picture element of interest, which level has been calculated for said region, and f) comparing a characteristic measure concerning the shape of said region, which has been judged as having the possibility of being said prospective abnormal pattern, and said predetermined threshold value with each other.

12. A method as defined in claim 10 wherein the detection of said prospective abnormal pattern is carried out with a detection process using a morphology filter, comprising the steps of:

a) carrying out a morphology operation, in which an opening processing is carried out on a high luminance-high signal level type of original image signal by using a multi-scale and a multiply structure element, and an image signal having been obtained from said opening processing is subtracted from said original image signal, and b) comparing the value, which has been obtained from said morphology operation, and said predetermined threshold value with each other.

13. A method as defined in claim 10 wherein the detection of said prospective abnormal pattern is carried out with a detection process using a morphology filter, comprising the steps of:

a) carrying out a morphology operation, in which an opening processing is carried out on a high luminance-high signal level type of original image signal by using a multi-scale and a multiply structure element, and an image signal having been obtained from said opening processing is subtracted from said original image signal, a first value being obtained from said morphology operation, b) calculating a second value in accordance with differential information, which is obtained by subtracting a Minkowski difference of said image signal from a Minkowski sum of said image signal, c) comparing said first value and the corresponding predetermined threshold value with each other, d) comparing said second value and the corresponding predetermined threshold value with each other, and e) detecting said prospective abnormal pattern in accordance with the results of the two comparisons.

14. A method as defined in claim 10 wherein said threshold value is set such that it may be in inverse proportion to said latitude and/or in proportion to the square root of said read-out sensitivity.

15. A method as defined in claim 11 wherein said threshold value is set such that it may be in inverse proportion to said latitude and/or in proportion to the square root of said read-out sensitivity.

16. A method as defined in claim 12 wherein said threshold value is set such that it may be in inverse proportion to said latitude and/or in proportion to the square root of said read-out sensitivity.

17. A method as defined in claim 13 wherein said threshold value is set such that it may be in inverse proportion to said latitude and/or in proportion to the square root of said read-out sensitivity.

18. A method as defined in claim 10 wherein said radiation image is a medical image.

\* \* \* \* \*